United States Patent
Silverstein et al.

(10) Patent No.: US 11,928,226 B2
(45) Date of Patent: Mar. 12, 2024

(54) CONTENT PROTECTING COLLABORATION BOARD

(71) Applicant: International Business Machines Corporation, Armonk, NY (US)

(72) Inventors: Zachary A. Silverstein, Jacksonville, FL (US); Shikhar Kwatra, Durham, NC (US); Sudhir Alluri, Bangalore (IN); Manish Anand Bhide, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 17/167,166

(22) Filed: Feb. 4, 2021

(65) Prior Publication Data
US 2022/0245265 A1 Aug. 4, 2022

(51) Int. Cl.
*G06F 21/00* (2013.01)
*G06F 16/215* (2019.01)
(Continued)

(52) U.S. Cl.
CPC .......... *G06F 21/62* (2013.01); *G06F 16/215* (2019.01); *G06V 40/10* (2022.01)

(58) Field of Classification Search
None
See application file for complete search history.

(56) References Cited

U.S. PATENT DOCUMENTS 8,334,902 B2 * 12/2012 Golovchinsky .......... H04N 7/18
348/157
8,468,244 B2 6/2013 Redlich et al.
(Continued)

FOREIGN PATENT DOCUMENTS

CA 2922139 C * 11/2021 ............. G06F 21/34
CN 104813265 A 7/2015
(Continued)

OTHER PUBLICATIONS

Lebanidze, E., "Securing Enterprise Web Applications at the Source: An Application Security Perspective," OWASP: The Open Web Application Security Project, 2017, 182 pgs.
(Continued)

*Primary Examiner* — Jeffery L Williams
(74) *Attorney, Agent, or Firm* — Stosch Sabo

(57) ABSTRACT

A marking onto a collaboration board, located in a first location, is detected. The marking includes the creation of one or more content elements on the collaboration board. Responsive to detecting the markings one or more content elements on the collaboration board are analyzed. A first content element of the one or more content elements is classified based on analyzing the one or more content elements. The first content element is classified as a first privileged content element. The first location of the collaboration board is scanned. The scanning is based on the classifying of the first privileged content element. An unauthorized person is identified based on scanning the first location. The unauthorized person is not permitted to view the collaboration board. A security response is performed on the collaboration board regarding the one or more content elements. The security response is performed responsive to identifying the unauthorized person.

20 Claims, 4 Drawing Sheets

(51) Int. Cl.
*G06F 21/62* (2013.01)
*G06V 40/10* (2022.01)

(56) References Cited

U.S. PATENT DOCUMENTS

| | | | | |
|---|---|---|---|---|
| 8,824,684 | B2 | 9/2014 | Calcaterra et al. | |
| 10,664,772 | B1* | 5/2020 | Poel | G06F 3/04842 |
| 11,321,643 | B1* | 5/2022 | Poel | G06Q 10/06311 |
| 11,638,147 | B2* | 4/2023 | Irvin | H04L 67/131 |
| | | | | 726/4 |
| 2009/0147958 | A1* | 6/2009 | Calcaterra | H04L 9/0833 |
| | | | | 380/260 |
| 2009/0254572 | A1* | 10/2009 | Redlich | G06Q 10/06 |
| 2013/0229333 | A1* | 9/2013 | Schwartz | G06F 1/3246 |
| | | | | 345/156 |
| 2017/0339216 | A1* | 11/2017 | Carlos | H04L 67/142 |
| 2019/0034851 | A1* | 1/2019 | Swieter | H04Q 9/00 |
| 2019/0065012 | A1* | 2/2019 | Masi | G09G 5/14 |
| 2020/0134238 | A1* | 4/2020 | Balakrishna | G06F 21/6245 |
| 2021/0342479 | A1* | 11/2021 | Schluntz | G06V 20/10 |
| 2022/0052986 | A1* | 2/2022 | Bran | G06F 21/84 |
| 2022/0245265 | A1* | 8/2022 | Silverstein | G06F 3/1454 |

FOREIGN PATENT DOCUMENTS

| | | | | |
|---|---|---|---|---|
| CN | 108733300 | A | 11/2018 | |
| EP | 3107049 | A1 * | 12/2016 | G06Q 10/10 |
| JP | 2017531266 | A | 10/2017 | |
| JP | 6437708 | B2 | 12/2018 | |
| KR | 100996787 | B1 | 11/2010 | |

OTHER PUBLICATIONS

Rane et al., "Raccoon: Closing Digital Side-Channels through Obfuscated Execution," 24th USENIX Security Symposium, Aug. 2015, 16 pgs.
Shostack, A., "Threat Modeling: Designing for Security," ebook, 2014, 626 pgs, Wiley.
Anonymous, "Method and System for Enabling Obfuscating Activities on a Smart Device for Enhancing Security Levels," An IP.com Prior Art Database Technical Disclosure, IP.com No. IPCOM000258966D, Jun. 28, 2019, 3 pgs.
Anonymous, "Smart touchscreen whiteboard with privacy management [P]," An IP.com Prior Art Database Technical Disclosure, IP.com No. IPCOM00025534D, Oct. 1, 2018, 2 pgs.
Anonymous, "System and Method for Sharing Whiteboard Information during Virtual Meetings," n IP.com Prior Art Database Technical Disclosure, IP.com No. IPCOM000241207D, Apr. 3, 2015, 5 pgs.
CSO Staff, "Secure Whiteboard," CSO Online Article, Jul. 21, 2008, 2pgs. https://www.csoonline.com/article/2122859/secure-whiteboard.html.
"How Safe is Your Data at Work?", Instant Offices Blog, Nov. 6, 2018, 8 pgs. https://www.instantoffices.com/blog/featured/how-safe-is-your-data-at-work/.
Slowey, L., "Ricoh, IBM and the interactive whiteboard every company needs," Internet of Things blog, Feb. 16, 2017, 1 page. https://www.IBM.com/blogs/internet-of-things/ricoh-IBM-interactive-whiteboard/.
"Erasing digital ink," SMART Meeting Pro 4.1, Printed: Feb. 7, 2020, 1 page. http://onlinehelp.smarttech.com/english/windows/help/meetingpro/4_1/Content/Product-UserInk/UsingSMARTInk/ErasingDigitalInk.htm.
"Latent Dirichlet allocation," Wikipedia, Printed: Feb. 7, 2020, 9 pgs. https://en.wikipedia.org/wiki/Latent_Dirichlet_allocation.

* cited by examiner

CONTENT PROTECTING COLLABORATION BOARD

BACKGROUND

The present disclosure relates to collaboration boards, and more specifically, to boards used for collaboration that protect content.

Collaboration boards may be used in workplaces to share content. The boards may encourage users to collaborate by allowing the drawing and writing of large-sized text that is easy for many people to see. The information that may be written on a collaboration board can include personal, private, or other sensitive information.

SUMMARY

According to embodiments of the present disclosure, described are a method, system, and computer program product. A marking onto a collaboration board is detected. The marking includes the creation of one or more content elements on the collaboration board. The collaboration board is located in a first location. Responsive to detecting the markings one or more content elements on the collaboration board are analyzed. A first content element of the one or more content elements is classified. The classification is based on analyzing the one or more content elements. The first content element is classified as a first privileged content element. The first location of the collaboration board is scanned. The scanning is based on the classifying of the first privileged content element. An unauthorized person is identified based on scanning the first location. The unauthorized person is not permitted to view the collaboration board. A security response is performed on the collaboration board regarding the one or more content elements. The security response is performed responsive to identifying the unauthorized person.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
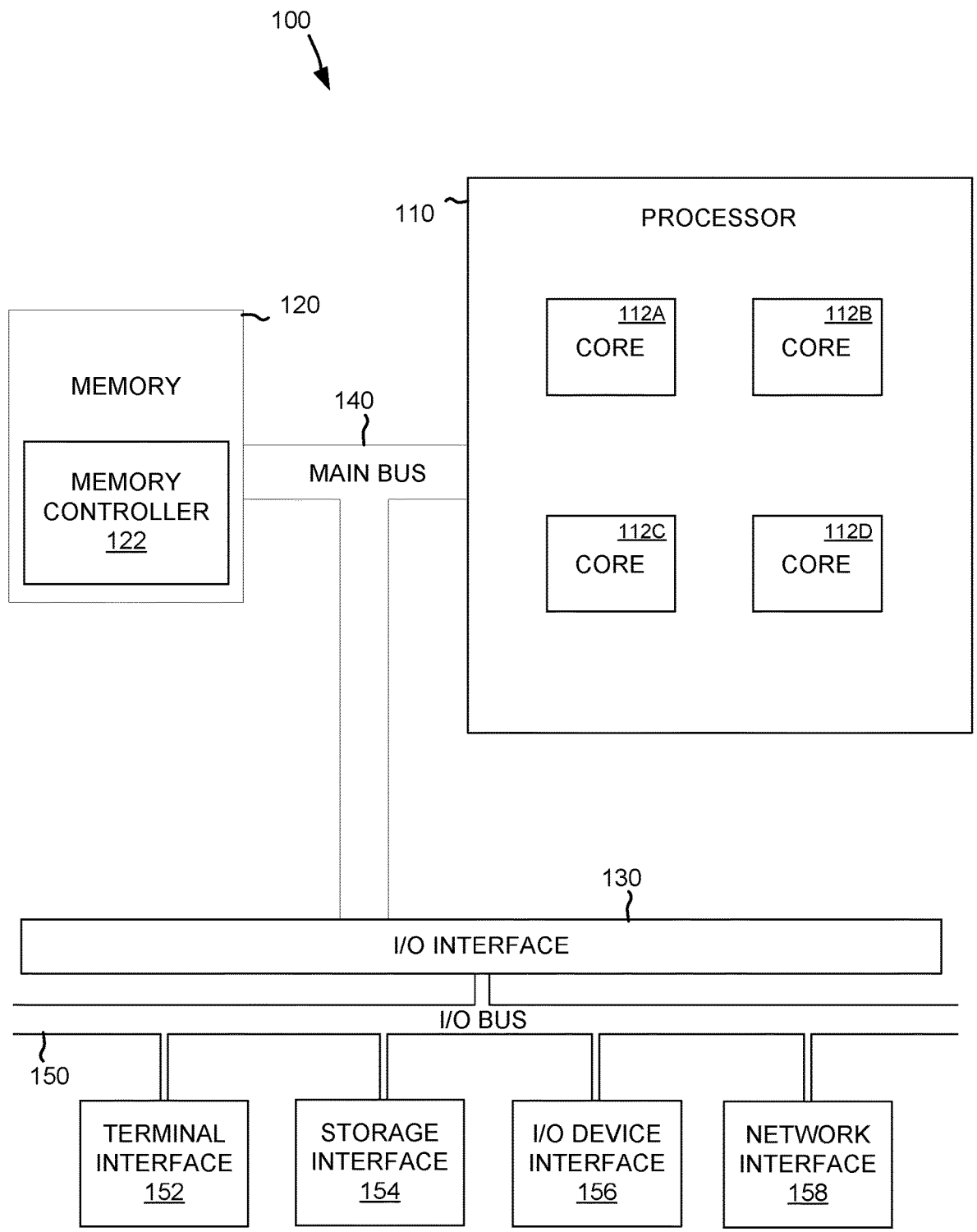
FIG. 1 depicts the representative major components of an example computer system (alternatively, computer) that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to collaboration boards; more particular aspects relate to boards used for collaboration that protect content. While the present disclosure is not necessarily limited to such applications, various aspects of the disclosure may be appreciated through a discussion of various examples using this context.

Collaboration boards can be useful tools for facilitating collaboration between multiple people. A collaboration board may be sized and shaped to permit people to discuss and hash out ideas. For example, a collaboration board can be five feet by twenty feet wide or other relatively large size. The relatively large size may permit one or more individuals to write on the board in large letters (e.g., letters being centimeters or more in height and width). The individuals may all gather together, and the size of the collaboration board may facilitate writings that are large enough for the group of individuals to each participate in an idea sharing process in the same geographic space (e.g., in a meeting room) or in multiple collaboration spaces (e.g., digital whiteboards).

A collaboration board may be a board configured for receiving markings from a person, such as drawing or writing. A collaboration board can be of a relevant material that permits both creating markings and erasing the markings. In a first example, a collaboration board can be thought of as a whiteboard configured to receive markings from whiteboard markers. In a second example, a collaboration board can include a blackboard or chalkboard configured to receive markings from chalk. In both examples, the markings may be readily removed by hand by use of an eraser, rubber, duster, erasing cloth, or other relevant erasing device. In some cases, a collaboration board may be a digital or electronic whiteboard configured to receive markings from a special pen. For example, a smart board may be configured to draw with a stylus and erase with a user gesture.

While collaboration boards can be very convenient to use, there are certain situations that pose a risk of compromising sensitive or confidential information. For example, after users are finished collaborating, users may walk away, sit down, or leave without erasing or removing the content from the board. It is not uncommon to find collaboration boards with important strategic or sensitive personal information. The collaboration boards may remain marked upon for many days.

To combat unauthorized sharing on collaboration boards, organizations such as education institutions or corporations may instate a policy of erasing after use or at the end of a meeting or class. Unfortunately, users may forget the policy or get busy working and may not, consequently, ensure information is wiped out of the board after use.

Another technique to protect against unauthorized content sharing on collaboration boards may include architectural or placement solutions. For example, buildings can be designed to protect the content of collaboration boards, or collaboration boards can be strategically positioned to limit unauthorized information disclosure. Changes to the location or layout may be impractical because rarely can organizations afford to build or rearrange physical fixtures such as a collaboration board. Further, increasing use of glass walls for office and conference rooms may expose collaboration boards to viewing by unauthorized persons casually. This issue is relevant to both smart boards as well as for traditional whiteboards. A smartboard may be configured to periodically or systematically erase markings. This may be a coarse-grain approach however that leaves users of the collaboration board with no time to write down or otherwise save the content depicted by the board before it is permanently removed.

A content protecting system (CPS) may alleviate the disadvantages of information being left viewable on a collaboration board. A CPS may be configured to erase a collaboration board based on detecting a security risk, for example, an unauthorized person being able to view a collaboration board or being in a proximity or vicinity of a collaboration board, or, in another example, a meeting associated with a collaboration board ending. The collaboration board may be tied to a specific meeting and, based on the location information in the meeting, all related collaboration boards may be erased automatically by the CPS. In a third example, a collaboration board's location may be categorized as viewable, such as being public or semi-public regarding the visibility of the collaboration board. The viewable collaboration board may be set to be erased automatically by the CPS based on the categorization, such as a set time, time period, or periodically (e.g., at 7 AM daily and 6:30 PM every weekday, ten minutes after a meeting ends, every twenty minutes), or based on an event (event-triggered, e.g., lights out, etc.).

A CPS may be configured to erase a collaboration board and may be configured to cache the contents before it is erased. A CPS may include a technique to capture the contents of the collaboration board and to capture the entirety of the collaboration board. The CPS may be configured to capture the contents of a collaboration board from a screen-buffer, such as in the case of a digital smart board. The CPS may be configured to capture the contents of a collaboration board from a camera located in the vicinity of the collaboration board. For example, a camera may be pointed inward to a meeting room that contains the collaboration board. In another example, the CPS may include a smart duster configured to capture the contents of a collaboration board.

The contents may be saved immediately. For example, by saving the information in a secure database. The contents may be cached or saved for later usage. For example, after capturing the one or more content elements. The contents may be cached within a memory locally by the CPS. Later (e.g., daily, after fifteen minutes, every hour, upon request, etc.) the cached captured collaboration board may be transmitted to the datastore.

In some embodiments, the CPS may detect confidential content by checking meetings and calendar entries. For example, if a meeting is marked as "Confidential", then the CPS may flag the one or more content elements on the collaboration board as privileged. Responsive to detecting an unauthorized person near or in a proximate location to the collaboration board, the CPS may begin erasure of the collaboration board and cache the erased content. In another example, if the attendees of a meeting all have the same security credentials associated with personnel records of the attendees, the CPS may determine that the meeting is privileged and the content on the collaboration board is also privileged.

In some embodiments, a CPS embodied as a digital smart board may be selectively or temporarily erased. For example, if during usage of a digital smart board, an unauthorized person may be identified as being near or within a vicinity or proximity or area of the board. The CPS may update a framebuffer, screen buffer, or other rendered area corresponding to the digital smart board to remove or hide markings that are classified as privileged. In some embodiments, all markings may be temporarily hidden or removed. The CPS may continuously monitor for unauthorized persons near the location of the digital smart board. Later, when an unauthorized person is no longer proximate to the board, the hidden content may again be shown (e.g., by replacing a framebuffer with the previously hidden content).

FIG. 1 depicts the representative major components of an example computer system 100 (alternatively, computer) that may be used, in accordance with some embodiments of the present disclosure. It is appreciated that individual components may vary in complexity, number, type, and\or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

Consistent with some embodiments of the disclosure, a CPS may leverage an image processor (not depicted). The CPS may leverage the image processor to perform object detection and analysis, to identify one or more persons. The CPS may leverage the image processor to determine if the one or more persons are unauthorized persons (persons that do not have access to view the contents of a collaboration board of the CPS). The CPS may leverage the image process to perform a security response, for example, to save one or more content elements of the collaboration board, and in another example, to save only a privileged content element of the one or more content elements of the collaboration board. The image processor may be a collection of hardware and software, such as an application specific integrated circuit.

The image processor may be configured to perform various image analysis techniques. The image analysis techniques may be machine learning and/or deep learning based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the image processor may be configured to aid in identifying a face (e.g., by analyzing images of faces using a model built on training data).

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a one or more content elements on a collaboration board may be analyzed. Using a relevant object detection algorithm, a privileged content element may be identified.

In some embodiments, features of the objects may be determined using a supervised machine learning model built using training data. For example, an image may be input into the supervised machine learning model and various classifications detected within the image can be output by the model. For example, characteristics such as object material, shape, size, color, and other characteristics may be output by the supervised machine learning model. Further, the identification of objects can be output as classifications determined by the supervised machine learning model.

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., multiple privileged content elements including a first privileged content element and a second privileged content element), colors of object, and/or other attributes of objects. In some embodiments, the output may generate a list including the identity and/or characteristics of objects. In some embodiments, the output may include an indication that an identity or characteristic of an object is unknown. The indication may include a request for additional input data that can be analyzed such that the identity and/or characteristics of objects may be ascertained. For example, a source of the object may be prompted to provide features of the face such that objects in their surrounding may be recognized. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person, a number related to a healthcare account of a person and one or more records of the person written together on a collaboration board, a drawing of a medical condition of a person on a collaboration board along with a unique identifier belonging to the person), relationships with other objects (e.g., an eye belongs to a face), or objects belonging to the same class (e.g., two account numbers of persons that are children of a third account number of a person that is a parent of the children).

The CPS may also leverage one or more machine learning techniques on content elements that are captured to identify content elements and for analysis and comparison to classify the identified content elements. For example, a handwriting from a first user may be identified and classified as a human writing based upon a handwriting recognition algorithm for optical character recognition. In a second example, a drawing of a person may be identified based on object analysis and comparison. The machine learning techniques may be based on and may be filtered using historical data. For example, historical data may be used (previous captures, training data sets, other anonymized data sets) using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The CPS may identify characters or letters as part of analysis of the one or more content elements of a collaboration board. The letters, symbols, glyphs, characters, or other relevant human-written language may be identified based on a natural language processing system (not depicted). In some embodiments, a natural language processing system may include various components (not depicted) operation through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. Various components (not depicted) of the natural language processor may include, but are not limited to, a tokenizer, a part-of-speech (POS) tagger, a semantic relationship identifier, and a syntactic relationship identifier. The natural language process may include a support vector machine (SVM) generator to process the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents. Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the natural language processing system.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a content element marked onto a collaboration board of a CPS that was identified by a machine learning technique as human writing at the natural language processing system, the natural language processor may output parsed text elements from the post as data structures. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

Figure 2:
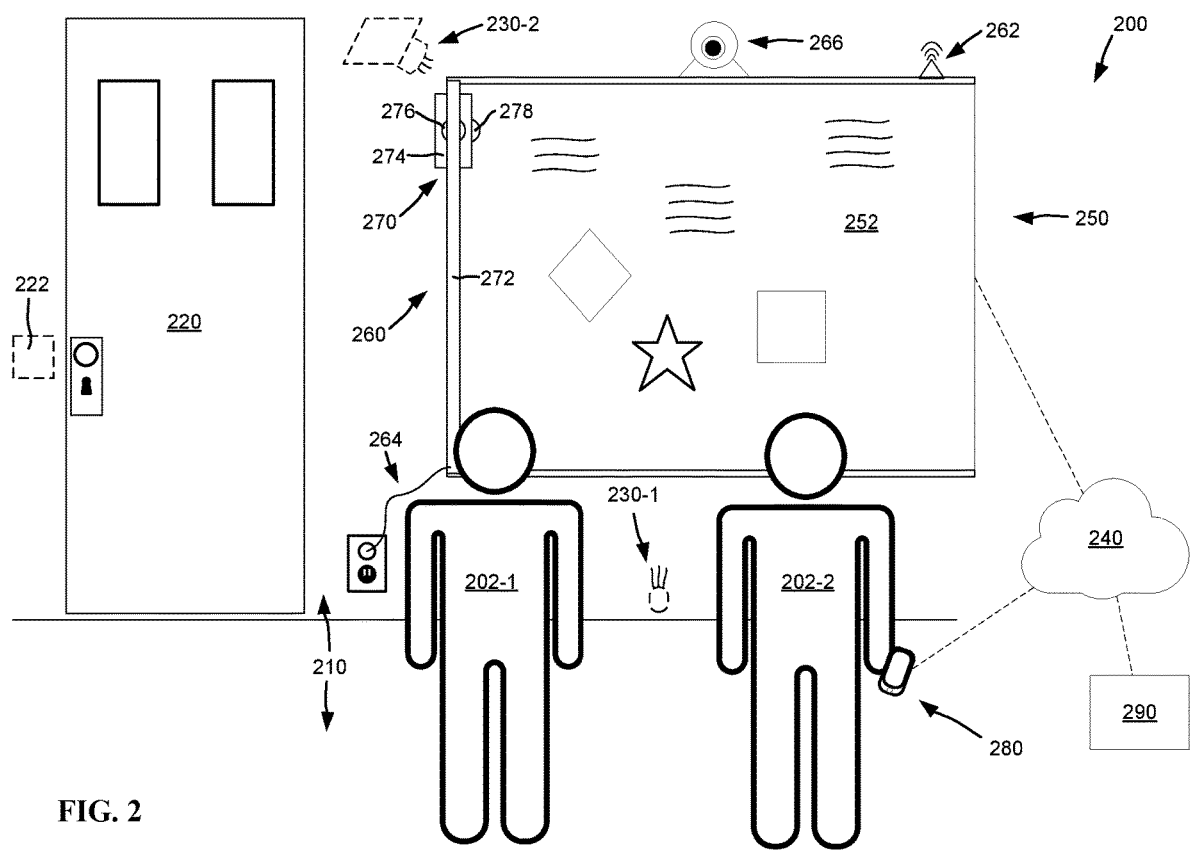
FIG. 2 depicts an example environment using a content protecting system (CPS), consistent with some embodiments of the disclosure.

FIG. 2 depicts an example environment 200 using a content protecting system (CPS), consistent with some embodiments of the disclosure. The example environment 200 may be an office building, a hospital, an education institution or other relevant location where collaboration may occur. The example environment may include the following: at least one meeting room 210 for persons including a first person 202-1 and a second person 202-2 to meet and collaborate; one or more Internet of Things (IoT) device 230-1 and 230-2 (collectively, 230) for communicating information; a network 240 for facilitating device communication; a collaboration board 250 configured to receive and erase markings from user; a CPS 260 to perform content protection and/or caching; and a processor 290 communicatively coupled to the network 240.

The meeting room 210 may include one or more walls and/or windows (not depicted) and a door 220. Door 220 may be controlled by a badge-based entry system including a badge reader 222 located on the outside of meeting room 210. The badge-based entry system may permit the entrance of a person based on an associated badge, biometric (e.g., fingerprint reader), or the like. For example, an access control system of a corporation may include a radio-frequency badge being assigned and worn by each employee of the corporation. Visitors to the environment 200 may likewise carry an assigned badge. The access control system may permit the opening of door 220 to any and all employees, or a subset of authorized employees, but may not permit access to opening of door 220 to visitors. Each employee may have an identification number assigned to their employment record that may also be assigned to their corresponding badge. The access control system may permit access to employment records stored in a secure datastore, such as by sending and receiving communications through network 240 to the badge reader 222.

The IoT devices 230 may be one or more sensors communicatively coupled to network 240. The IoT device 230s may include a motion sensor, visible light camera, infrared camera, or other relevant sensors configured to identify certain aspects of environment 200. For example, the IoT devices 230 may be motion sensors configured to detect the movement of persons near the meeting room 210. The IoT devices 230 may have a capability to sense movement within the proximity of meeting room 210, such as in a nearby hallway or other adjacent room (not depicted). The IoT devices 230, may periodically or continuously monitor the proximate area to meeting room 210 and may, responsive to detecting movement, transmit updates to a central server (not depicted) through network 240. The central server may record in a secure datastore updates regarding the movement or presence of persons in the environment 200 as well as in the proximate area of meeting room 210.

In some embodiments, the IoT device 230 may be a visible light camera configured to monitor and record a video stream of one or more images based on sensors located internally or externally. For example, IoT device 230-1 may be a motion sensor configured to communicate directly with other IoT devices 230. IoT device 230-2 may be a camera configured to begin capturing a video stream responsive to receiving a message from IoT device 230-1. IoT device 230-2 may transmit to a secure data store one or more video streams that contain persons or other moving objects. The objects within the video stream may be analyzed for persons based on an image processor and/or using one or more machine learning techniques.

The collaboration board 250 may facilitate the sharing of ideas between persons in the meeting room 210 including the first person 202-1 and the second person 202-2. The CPS 260 may facilitate the protection and caching of content on the collaboration board 250. The collaboration board 250 may include a flat surface 252 for marking. The flat surface 252 of the collaboration board 250 may be a board configured to accept markings (e.g., a whiteboard surfaced to accept markings from a marker, a blackboard textured to accept markings from chalk, a digital touch surface to accept markings from a user).

The CPS 260 may include the following: a network connection 262; a power source 264; a collaboration camera 266; and a content caching and protecting duster (CCPD) 270. The network connection 262 may be a wireless network adapter configured to transmit data to and receive data from network 240, for example, to transmit the cached one or more content elements marked on the flat surface 252 to a secure datastore through network 240. Though FIG. 1 depicts network connection 262 as a wireless network connection, some embodiments contemplate other relevant network connections (e.g., a wired connection a personal area network connection, an IoT connection). The power source 264 may be a wired power source from an outlet located within the meeting room 210. In some embodiments, the power source 264 may be wireless (such as a battery or capacitor built into the collaboration board 250).

In some embodiments, the detection of one or more content elements on the flat surface 252 may be performed by an image sensor (not depicted) present in the meeting room 210. For example, an image sensor may be mounted on an adjacent wall (not depicted) or in a projector (not depicted) or a meeting table (not depicted). The image sensor may be oriented to capture the flat surface 252. The image sensor may be communicatively coupled to the network 240 and may facilitate an image processor to perform analysis and classification of the markings on the flat surface 252.

The collaboration camera 266 may be an external camera (a camera located on the outside of the collaboration board 250). For example, FIG. 1 depicts the collaboration camera 266 affixed to above the collaboration board 250. The collaboration camera 266 may be configured to view the contents of meeting room 210, such as the first person 202-1 and the second person 202-2. The collaboration camera 266 may be a visible light camera with a wide-angle lens configured for capturing a video stream of the meeting room 210. The video stream captured by the collaboration camera 266 may be analyzed by a processor 290 and memory (not depicted) embedded within the collaboration board 250. The processor 290 may include an image processor configured to identify persons in the meeting room 210 based on relevant techniques (e.g., facial recognition). The collaboration camera 266 may be configured to view the contents of the collaboration board 250. For example, the collaboration camera 266 may be a wide-angle camera directed at the flat surface 252 of the collaboration board 250 and configured to capture the markings including one or more content elements.

The CCPD 270 may be an eraser, duster or other suitable erasing device affixed adjacent to the flat surface 252 of the collaboration board 250. The CCPD 270 may include the following: a track 272; a duster 274; a pivotable mount 276; a motor (not depicted); and a duster camera 278. The track 272 may be configured to affix the CCPD 270 to the collaboration board 250. The track 272 may permit the movement of the duster 274 throughout the flat surface 252. The track 272 may have physical features (not depicted) to permit motion of the duster 274 or operation of the CCPD 270, such as teeth, grooves, guides, or other relevant surfacing or shapes. The motor (not depicted) may receive power from the power source 256 of the collaboration board 250 and may be configured to move the CCPD 270 along the flat surface 252. The pivotable mount 276 of the CCPD 270 may be configured to rotate the duster 274 such that the duster camera 278 is arranged in front of the duster 274 along a pathway of erasure. The duster camera 278 may be configured to capture the markings including one or more content elements located on the collaboration board 250. For example, as the motor moves the duster 274 and the duster camera 278 along the flat surface 252. The pivotable mount 276 may rotate the duster 274 and the duster camera 278 such that the markings that are about to be erased are adjacent to the duster camera 278. The duster camera 278 may take pictures, images, or other relevant video signals of the flat surface 252 of the collaboration board 250. The images captured by the duster camera 274 may be transmitted to a secure datastore through a network 240.

In some embodiments, the CPS 260 may operate without a specialized duster. For example, the collaboration board 250 may be a digital collaboration board 250 with a flat screen capable of accepting touch as the flat surface 252. The CPS 260 may capture and operate on the flat surface 252 and the underlying displayed data by obtaining one or more copies of the framebuffer or video stream that represents the display of the flat screen.

Based on detecting a person within an area proximate to the collaboration board 250, the CPS 260 may save and then erase the flat surface 252. For example, the CPS 260 may receive information from the IoT devices 230, the badge reader 222, the collaboration camera 266, or some combination of sensors that are scanning the area around and within the meeting room 210. Based on the received information, the CPS 260 may identify that an unauthorized person is able to view the flat surface 252. Responsively to identifying an unauthorized person, the CPS 260 may decide to erase, and before erasing, cache the content elements of the markings on the flat surface 252. In some embodiments, the CPS 260 may scan the markings on the flat surface and may analyze the one or more content elements of the markings to determine if one or more of the content elements are privileged content elements. The capturing of the contents may be based on performing an analysis of the content of a collaboration board 250.

For example, the CPS 260 may use machine learning techniques and natural language processing performed by processor 290 to classify the one or more content elements as privileged content or privileged content elements. The analysis may be performed by an image processor to classify the content elements as privileged or nonprivileged content elements. For example, a collaboration board may include markings (e.g., writing, drawing) that are provided by the first person 202-1 during a meeting. The markings may be representative of one or more content elements including certain privileged content elements. The CPS 260 may use the classification of the one or more content elements to selectively perform erasure of the flat surface 252. For example, if a content element is a privileged content element the CPS 260 may erase only a portion of flat surface 252 that corresponds to the privileged content element. The collaboration board 250 may use the classification of the one or more content elements to order the performance of erasure of the flat surface 252. For example, if a particular section of the collaboration board 250 is determined to contain a privileged content element, then it may be erased before other portions of the collaboration board.

The CPS 260 may communicate over the network 240 to provide the one or more content elements for access by authorized persons. For example, the second person 202-2 may be detected by the collaboration camera 266 and may be identified as an authorized person. The CPS 260 may save the markings including the one or more content elements on the collaboration board. The CPS 260 may save the markings in the form of a file such as a document file or an image file. The CPS 260 may save the markings in a location, such as a shared folder associated with the second person 202-2. The CPS 260 may generate a notification of the availability of the markings in the location, such as a text message to a mobile device 280.

Figure 3A:
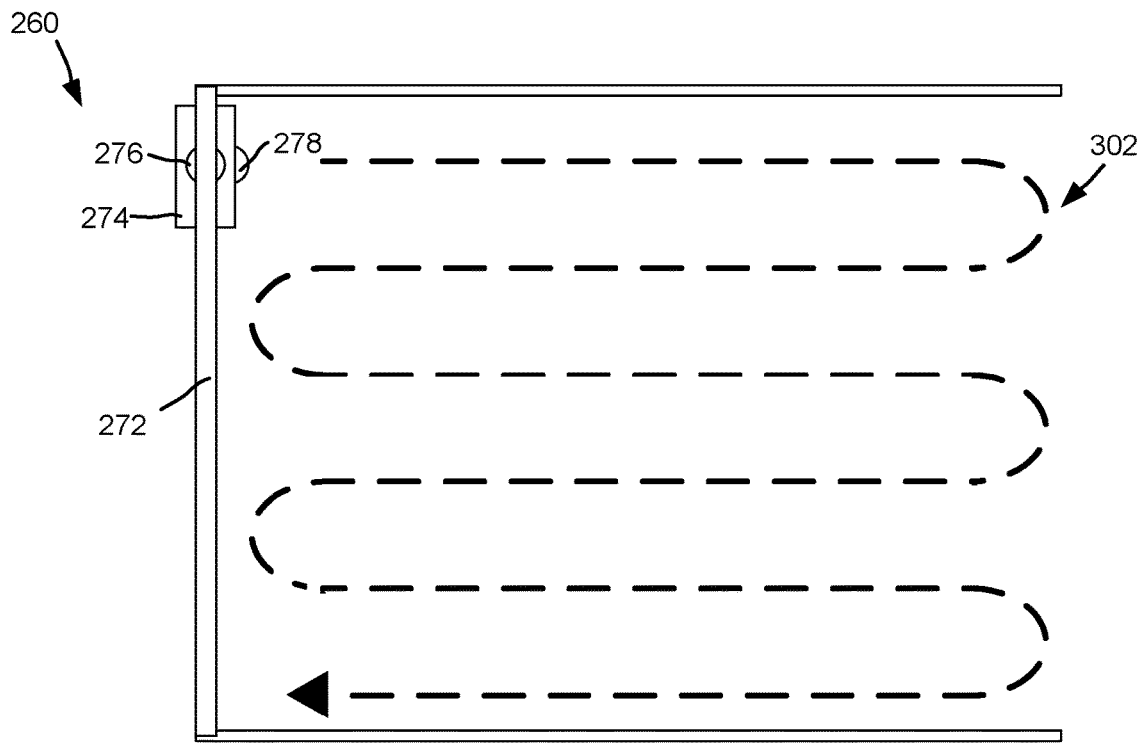
FIG. 3A depicts an example CPS for performing content protection on a physical collaboration board, consistent with some embodiments of the disclosure.

FIG. 3A depicts an example CPS 260 for performing content protection on a physical collaboration board, consistent with some embodiments of the disclosure. The CPS 260 may be configured to attach to a collaboration board (not depicted) and move along a flat surface of the collaboration board (e.g., along the surface of a whiteboard to cache and erase markings from a marker, along the surface of a blackboard to cache and erase markings from chalk). The CPS 260 may include the following: a frame 272 for affixing to a collaboration board and facilitate movement of the CPS; a duster 274 for erasing marker; a pivotable mount 276 for rotating the duster; and a duster camera 278 for capturing content elements depicted by the markings on the flat surface.

At a first time, as illustrated by FIG. 3A, the CPS 260 may be configured to move along a first pathway 302. The first pathway 302 may cover the entirety of a flat surface of a collaboration board (not depicted). The first pathway 302 is depicted for illustrative purposes. Though a left-to-right and top-to-bottom, first pathway 302 is depicted, other pathways are contemplated. For example, a random up-down-left-right pathway, a random diagonal pathway, a content-based pathway, a combination of left-right-up-down pathway and random diagonal pathways, etc.

As the CPS 260 moves along the first pathway 302, the duster 274 may be in a disengaged position. For example, the duster 274 may be configured to be in an engaged position and a disengaged position. When the CPS 260 is affixed to a collaboration board, the duster 274 may be adjacent, touching, or otherwise in contact with and configured to perform erasures of a flat surface of the collaboration board in the engaged position. When the CPS 260 is affixed to the collaboration board, the duster 274 may be separated, distal, or otherwise not in contact with and configured to move along the flat surface without performing erasures of the flat surface in the disengaged position. The disengaged position may place the duster 274 a distance from the flat surface (e.g., a few inches, twenty-five millimeters, one centimeter, a millimeter). The disengaged position may still permit the duster camera 278 to view—and, consequently capture and save—the one or more content elements.

As the CPS 260 moves along the first pathway 302, the pivotable mount 276 may rotate the duster 274 and the duster camera 278. For example, at the beginning of the first pathway 302, the CPS 260 may be configured to move horizontally from the upper left portion to the upper right portion. As the CPS 260 moves left to right, the duster camera 278 passes over the flat surface before the duster 274 due to rotation provided by the pivotable mount 276. As the CPS 260 moves along the first pathway 302, the pivotable mount 276 may be configured to continuously rotate the duster 274 and the duster camera 278 such that the duster camera passes over content before the duster.

Figure 3B:
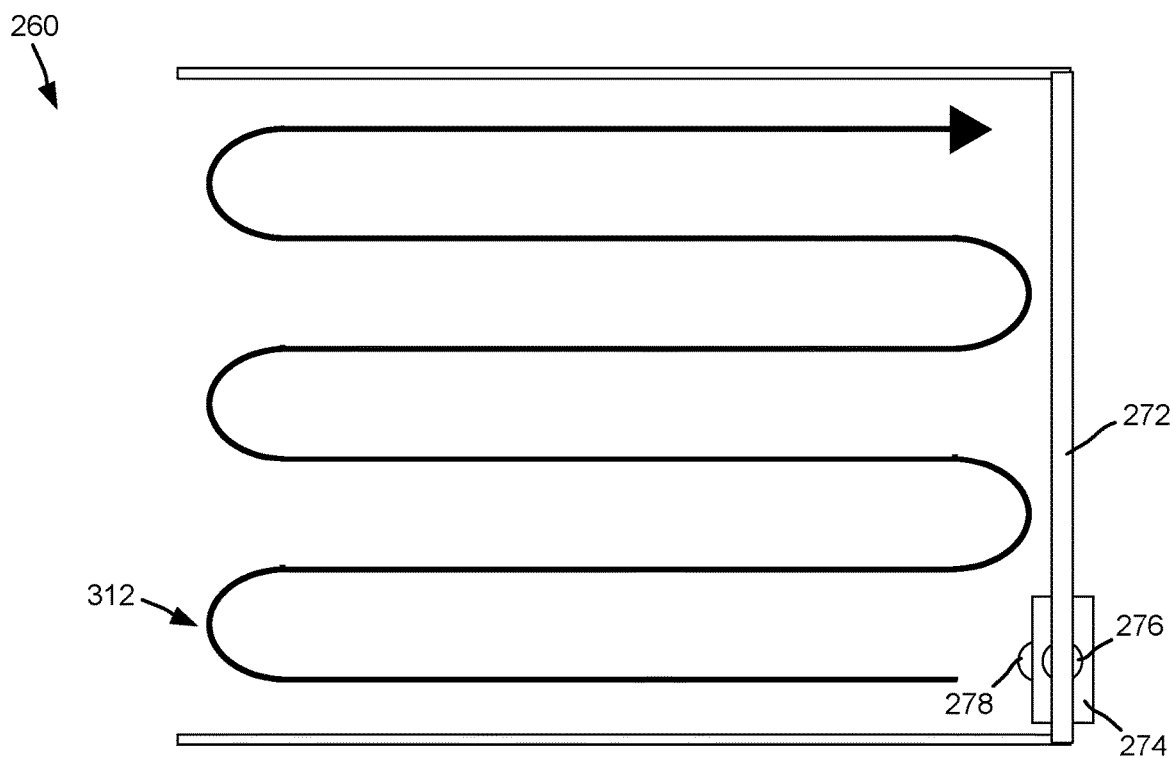
FIG. 3B depicts an example CPS for performing content protection, consistent with some embodiments of the disclosure.

FIG. 3B depicts an example CPS 260 for performing content protection, consistent with some embodiments of the disclosure. The content protection performed at FIG. 3B may be performed after the content protection depicted in FIG. 3A. The CPS 260 may be configured to perform an erasure at the second time. For example, the duster 274 may be placed into an engaged position to remove content from the flat surface of a collaboration board (not depicted). The CPS 260 may be configured to move along a second pathway 312 at the second time. The second pathway 312 may be similar to the first pathway 302 of FIG. 3A. In some embodiments, the second pathway 312 may be different from the first pathway 302. For example, the second pathway 312 may be a random left-right-up-down pathway, a random diagonal pathway, a content-based pathway, a combination of up-down-left-right and random diagonal pathways, etc.

In some embodiments, the CPS 260 may be configured to perform both a capturing of the content for caching and an erasure contemporaneously or simultaneously contemporaneously. For example, the pivotable mount 276 of the CPS 260 may rotate or otherwise orient the duster camera 278 to move along a given pathway in front of, or just before, the duster 274. The rotation or orientation may configure the CPS 260 to capture and save one or more content elements of the collaboration (by the duster camera 278) before they are erased (by the duster 274).

The one or more of the pathways 302, 312 may be calculated so that it can be ensure an entire region or portion of the flat surface 352 is erased. The pathways 302, 312 may take into account the duster shape to ensure that the path combined with the duster shape results in a complete erasure. For a smaller duster, a tighter and lengthier pathway 302, 312 may be calculated. For a larger duster, a looser and shorter pathway 302, 312 may be calculated, but the smaller duster may allow for more precision. In this way, only regions or portions of the flat surface 352 containing sensitive information need to be erased.

In some embodiments, the pathway 302 depicted in FIG. 3A and the pathway 312 depicted in FIG. 3B may be performed by a CPS 260 on a digital collaboration board. For example, a digital collaboration board may have a screen-buffer or other digital representation of a collaboration board with markings that represent the markings created by a user during collaboration. The CPS 260 may operate by moving along a relevant pathway to scan and capture the content elements within the digital representation. The CPS 260 may operate by moving along a relevant pathway to erase or otherwise remove the bits that represent the one or more content elements from the digital representations. The pathways that the CPS 260 may travel through the screen-buffer or other digital representation may include a random left-right-up-down pathway, a random diagonal pathway, a content-based pathway, a combination of up-down-left-right and random diagonal pathways, etc.

Figure 4:
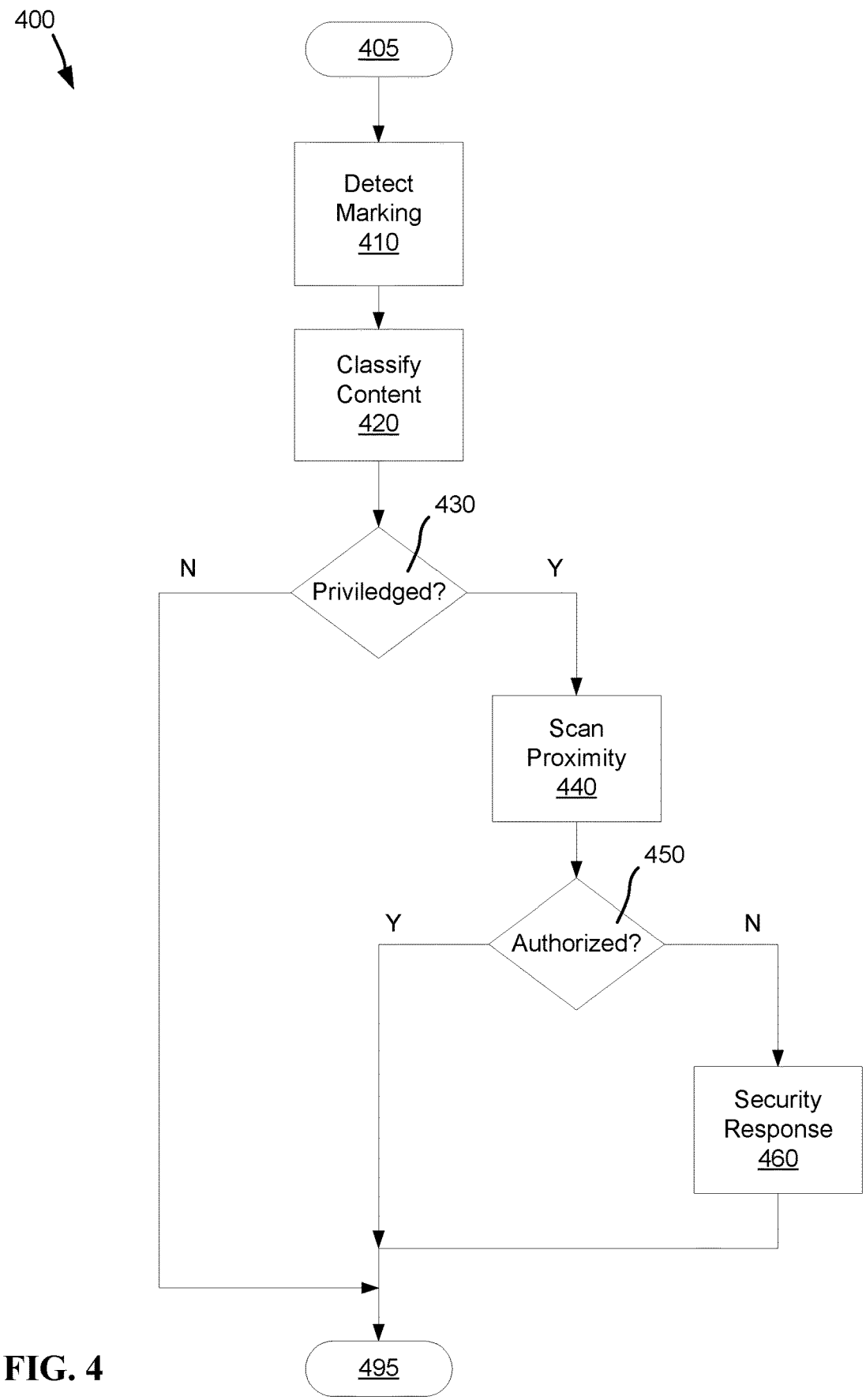
FIG. 4 depicts an example method for performing content protection on a collaboration board, consistent with some embodiments of the disclosure.

FIG. 4 depicts an example method 400 for performing content protection on a collaboration board, consistent with some embodiments of the disclosure. Content protection may be performed directly by a processor and memory embedded into a CPS (such as the CPS 260 of FIG. 2). Content protection may be performed by a processor and memory communicatively coupled to a collaboration board (such as computer system 100 of FIG. 1) that may, for example, form a part of the CPS 260.

Method 400 begins at 405, as a marking is detected on a collaboration board 250 at 410. The collaboration board 250 may be configured to receive markings, such as writing and drawing from one or more users. The markings may depict or otherwise include one or more content elements. For example, a first user may draw an image of a medical condition of a patient. In another example, a second user may write down a list of one or more classified serial numbers.

Content elements of the markings may be classified at 420. The content elements may be classified based on an analysis of the one or more content elements. For example, in response to detecting markings on a collaboration board 250, the one or more content elements depicted by the markings may be analyzed. The analysis may be performed based on an image processor, machine learning algorithm, natural language processing, or other relevant analysis technique.

Classification of the one or more content elements may include determining if there are any privileged content elements. For example, certain content elements depicted on a collaboration board 250 may include privileged, confidential, or other information that is should be hidden. A CPS 260 may capture and perform an optical character recognition on the markings to alter the format from a collection of strokes or other marks into a group of content elements. The alteration may include performing an image analysis and natural language processing to change the visual strokes of the markings into information content elements. These content elements may be stored in a secure datastore. The content elements may be classified by usage of a machine learning algorithm or other relevant technology to perform classification operations. The classification operations may include comparing the content elements to separate data sources (e.g., employment records, medical records, training data including certain datasets). The classification operation may include comparing the content elements to each other (e.g., comparing a first content element of the one or more content elements to a second content element of the one or more content elements).

If it is determined that one or more content elements are privileged, at 430:Y, then a proximity of the collaboration board 250 may be scanned at 440. The proximity may be scanned by monitoring one or more sensors located proximate to the collaboration board 250. For example, an IoT sensor device may broadcast or otherwise transmit information related to the location or proximity of the location of the collaboration board 250 (e.g., movement). In another example, an image may be analyzed through an image processor. The image may be received from an external camera (such as a security camera) located in a hallway or other area proximate to the collaboration board 250. The image may be analyzed using facial recognition to identify a person and to match the person to a list of authorized parties. In a third example, a badge reader of a badge-based entry door may transmit to a secure datastore badge swipes and associated identification numbers. Scanning the proximity may include monitoring for and detecting a badge-based entry into a room that contains the collaboration board 250 or into a room that is adjacent to the collaboration board 250. The badge information related to the badge-based entry may identify a serial number associate with a person.

Scanning the proximity of the collaboration board 250 may include detecting persons and identifying persons that are authorized or that are unauthorized to view the collaboration board 250. Scanning the proximity may include detecting persons that are permitted or not permitted to see the one or more content elements on the collaboration board 250, for example, detecting persons based on performing facial recognition on an image of a person, or in another example, detecting a serial number corresponding to a person. Once a person is detected, the detected person may be compared to an authorization list.

The authorization list may be based on the one or more content elements. The authorization list may be based on one or more persons. For example, a collaboration board 250 may be located in a meeting room that has a corresponding electronic meeting room record. The electronic meeting room record may be associated with a meeting including one or more persons that are invited to the meeting. Scanning for unauthorized persons may include determining that a person is not on the list of invited persons to the meeting associated with the meeting room of the collaboration room.

The authorization list may be based on a combination of content elements and persons. For example, an authorization list may be updated with categorizes of content elements during content classification, at 420. The authorization list may include one or more tags, keywords, triggers, or other relevant flags (e.g., "design data", "patient information", "sensitive information", etc.). The authorization list may also include one or more persons authorized to view the data based on the tags. For example, Table 1:

TABLE 1

| Person | Identification # | Role | Content | Facial Hash |
|---|---|---|---|---|
| Jane Smith | 123456 | Engineer | Design Data, Circuit Schematics, Memory Performance | DPc*I8#mXHwiigkY@E(Kyzj^ |
| Jason Rogers | 123578 | Human Resources | Payroll, Hiring, HR | Ic7P@&Rc(8wZ3iwnlic54TjZ |
| John Jones | 123789 | Sales | Design data, Sales, Marketing | qLs^lFn!MCD!TsnrbV*)L!HW |

Using Table 1, the scanning for persons may include determining that content elements drawn on a collaboration board 250 include drawings relevant to a design of a new microprocessor. Based on the content elements, the content classification may be that a collaboration board 250 may be related to "circuit schematics" and resultantly Jane may be an authorized person able to view the collaboration board 250. Further, Jason and John may be unauthorized persons not able to view the authorization board. During scanning, a badge reader may bring back an identification number of '123578' and it may be determined that the person is an unauthorized person. During scanning, a facial hash of a person may include hash 'DPc*I8 #mXHwiigkY@E(Kyzj^' and it may be determined that the person is an authorized person.

If a person is identified as an unauthorized person, at 450:N, a security response may be performed at 460. The security response may be to erase the collaboration board 250. Erasing the collaboration board 250 may include erasing the entire collaboration board 250 including all markings. Erasing the collaboration board 250 may include erasing only certain content elements. For example, only erasing content elements that are identified as privileged content elements and not erasing one or more content elements that are not identified as privileged. Performing a security response includes instructing a content capturing duster to perform an erasure of content elements and instructing the duster to also capture the one or more content elements.

The content capturing duster may move along a pathway to perform an erasure of the content elements but before performing the erasure an image sensor (such as a camera) may capture the content elements. Performing the security response may include storing, saving, caching, or otherwise making available the content elements that have been erased. For example, transferring or saving the captured content elements in a shared folder accessible only by authorized persons. In another example, emailing or messaging the captured content elements to one or more parties that attend the meeting. If a person is identified as authorized (450:Y), if content is not determined to be privileged (430:N), or after performing a security response (460), method 400 ends at 495.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting a marking on a collaboration board, the marking including one or more content elements on the collaboration board, the collaboration board located in a first location;
   analyzing, in response to detecting the marking, the one or more content elements on the collaboration board, wherein the analyzing comprises inputting the one or more content elements to a machine learning model implementing an object detection algorithm;
   classifying, based on the analyzing of the one or more content elements and an output of the machine learning model implementing the object detection algorithm, a first content element of the one or more content elements as a first privileged content element;
   scanning, based on the classifying of the first privileged content element, a proximity of the collaboration board;
   identifying, based on the scanning the proximity, an unauthorized person who is not permitted to view the one or more content elements on the collaboration board, wherein the identifying comprises:
      detecting a badge-based entry with a first badge into a room, wherein the room is proximate to the first location, and wherein the first badge is associated with a first person;
      comparing, in response to the detecting of the badge-based entry, an identifier on the first badge to an authorization list, the authorization list including identifiers of persons authorized to view the collaboration board; and
      determining, based on the comparing of the identifier to the authorization list, the first person is not on the authorization list; and
   erasing, in response to the identifying of the unauthorized person, the one or more content elements from the collaboration board.

2. The method of claim 1, wherein the first location is part of an electronic meeting that includes an end time representative of an end of the electronic meeting and wherein identifying the unauthorized person includes detecting a person at the first location at a first time, the first time after the end time of the electronic meeting.

3. A system comprising:
   a collaboration board, the collaboration board located in a first location;
   a memory, the memory containing one or more instructions;
   a badge reader, the badge reader communicatively coupled to a processor; and
   the processor, the processor communicatively coupled to the memory, the processor, in response to reading the one or more instructions, configured to:
      detect a marking on the collaboration board, the marking including the creation of one or more content elements on the collaboration board;

analyze, in response to detecting the marking, the one or more content elements on the collaboration board, wherein the analyzing comprises inputting the one or more content elements to a machine learning model implementing an object detection algorithm;

classify, based on analyzing of the one or more content elements and an output of the machine learning model implementing the object detection algorithm, a first content element of the one or more content elements as a first privileged content element;

scan, based on classifying of the first privileged content element, a proximity of the collaboration board;

identify, based on scanning the proximity, an unauthorized person, the unauthorized person not permitted to view the collaboration board, wherein the identifying comprises:
　detecting a badge-based entry with a first badge into a room, wherein the room is proximate to the first location, and wherein the first badge is associated with a first person;
　comparing, in response to the detecting of the badge-based entry, an identifier on the first badge to an authorization list, the authorization list including identifiers of persons authorized to view the collaboration board; and
　determining, based on the comparing of the identifier to the authorization list, the first person is not on the authorization list; and
erase, in response to identifying the unauthorized person, the one or more content elements from the collaboration board.

4. A computer program product, the computer program product comprising:

one or more computer readable storage media; and program instructions collectively stored on the one or more computer readable storage media, the program instructions configured to:
　detect a marking on a collaboration board, the marking including one or more content elements on the collaboration board, the collaboration board located in a first location;
　analyze, in response to detecting the marking, the one or more content elements on the collaboration board, wherein the analyzing comprises inputting the one or more content elements to a machine learning model implementing an object detection algorithm;
　classify, based on analyzing of the one or more content elements and an output of the machine learning model implementing the object detection algorithm, a first content element of the one or more content elements as a first privileged content element;
　scan, based on classifying of the first privileged content element, a proximity of the collaboration board;
　identify, based on scanning the proximity, an unauthorized person, the unauthorized person not permitted to view the collaboration board, wherein the identifying comprises:
　　detecting a badge-based entry with a first badge into a room, wherein the room is proximate to the first location, and wherein the first badge is associated with a first person;
　　comparing, in response to the detecting of the badge-based entry, an identifier on the first badge to an authorization list, the authorization list including identifiers of persons authorized to view the collaboration board; and
　　determining, based on the comparing of the identifier to the authorization list, the first person is not on the authorization list; and
　erase, in response to identifying the unauthorized person, the one or more content elements from the collaboration board.

5. The method of claim 1, wherein the machine learning model implementing the object detection algorithm comprises a Region-based Convolutional Neural Network (R-CNN).

6. The method of claim 1, wherein the machine learning model implementing the object detection algorithm comprises a You Only Look Once (YOLO) machine learning algorithm.

7. The method of claim 1, wherein the machine learning model implementing the object detection algorithm comprises a Single Shot Multibox Detector (SSD).

8. The method of claim 1, wherein the machine learning model implementing the object detection algorithm comprises a Scale-Invariant Feature Transform (SIFT).

9. The method of claim 1, wherein the machine learning model implementing the object detection algorithm comprises a Histogram of Oriented Gradients (HOG).

10. The system of claim 3, wherein the first location is part of an electronic meeting that includes an end time representative of an end of the electronic meeting, and wherein identifying the unauthorized person includes detecting a person at the first location at a first time, the first time after the end time of the electronic meeting.

11. The system of claim 3, wherein the machine learning model implementing the object detection algorithm comprises a Region-based Convolutional Neural Network (R-CNN).

12. The system of claim 3, wherein the machine learning model implementing the object detection algorithm comprises a You Only Look Once (YOLO) machine learning algorithm.

13. The system of claim 3, wherein the machine learning model implementing the object detection algorithm comprises a Single Shot Multibox Detector (SSD).

14. The system of claim 3, wherein the machine learning model implementing the object detection algorithm comprises a Scale-Invariant Feature Transform (SIFT).

15. The system of claim 3, wherein the machine learning model implementing the object detection algorithm comprises a Histogram of Oriented Gradients (HOG).

16. The computer program product of claim 4, wherein the first location is part of an electronic meeting that includes an end time representative of an end of the electronic meeting, and wherein identifying the unauthorized person includes detecting a person at the first location at a first time, the first time after the end time of the electronic meeting.

17. The computer program product of claim 4, wherein the machine learning model implementing the object detection algorithm comprises a Region-based Convolutional Neural Network (R-CNN).

18. The computer program product of claim 4, wherein the machine learning model implementing the object detection algorithm comprises a You Only Look Once (YOLO) machine learning algorithm.

19. The computer program product of claim 4, wherein the machine learning model implementing the object detection algorithm comprises a Single Shot Multibox Detector (SSD).

20. The computer program product of claim 4, wherein the machine learning model implementing the object detection algorithm comprises a Scale-Invariant Feature Transform (SIFT).

\* \* \* \* \*